(12) United States Patent
Lazen et al.

(10) Patent No.: US 7,945,659 B2
(45) Date of Patent: May 17, 2011

(54) TECHNOLOGY ADMINISTRATIVE PORTAL

(75) Inventors: Alexander Lazen, Stamford, CT (US); Jason X. Yao, Brooklyn, NY (US)

(73) Assignee: Barclays Capital Inc., New York, NY (US)

( * ) Notice: Subject to any disclaimer, the term of this patent is extended or adjusted under 35 U.S.C. 154(b) by 1428 days.

(21) Appl. No.: 11/326,936

(22) Filed: Jan. 5, 2006

(65) Prior Publication Data

US 2006/0168278 A1   Jul. 27, 2006

Related U.S. Application Data

(60) Provisional application No. 60/641,808, filed on Jan. 5, 2005.

(51) Int. Cl.
*G06F 15/177* (2006.01)
*G06F 15/173* (2006.01)
*G06F 15/16* (2006.01)

(52) U.S. Cl. ........ 709/224; 709/220; 709/221; 709/222; 709/223; 709/225; 709/226; 709/227; 709/228; 709/229; 709/249; 709/250

(58) Field of Classification Search .................. 709/238, 709/239, 220–229, 249–250
See application file for complete search history.

(56) References Cited

U.S. PATENT DOCUMENTS

| 5,410,598 | A |   | 4/1995 | Shear ................................. 380/4 |
| 5,930,476 | A | * | 7/1999 | Yamunachari et al. ........ 709/224 |
| 6,054,987 | A | * | 4/2000 | Richardson .................... 715/734 |
| 6,477,572 | B1 | * | 11/2002 | Elderton et al. .............. 709/224 |
| 6,505,248 | B1 | * | 1/2003 | Casper et al. .................. 709/224 |
| 6,795,941 | B2 |   | 9/2004 | Nickels ........................... 714/706 |
| 6,804,701 | B2 |   | 10/2004 | Muret et al. .................... 709/203 |
| 6,810,361 | B1 |   | 10/2004 | Anderson ....................... 702/186 |
| 7,293,070 | B2 | * | 11/2007 | Moses et al. ................... 709/217 |
| 7,315,826 | B1 | * | 1/2008 | Guheen et al. ...................... 705/7 |
| 7,328,078 | B2 | * | 2/2008 | Sanford et al. ................ 700/108 |
| 2001/0042016 | A1 | * | 11/2001 | Muyres et al. ................... 705/14 |
| 2001/0051996 | A1 | * | 12/2001 | Cooper et al. ................. 709/217 |

(Continued)

FOREIGN PATENT DOCUMENTS

JP    2004094923 A  *  3/2004

OTHER PUBLICATIONS

Spahn, D., Managing access to distributed resources, 2004, IEEE Comput. Soc, Los Alamitos, CA, USA, 2006017, Proceedings of the 37th Annual Hawaii International Conference on System Sciences, 2004, p. 8 pp. 20 refs, pp. lxxi+320.*

(Continued)

*Primary Examiner* — Nathan Flynn
*Assistant Examiner* — Kai J Chang
(74) *Attorney, Agent, or Firm* — Morgan Lewis & Bockius LLP

(57) ABSTRACT

A system and method for determining and displaying return-on-investment (ROI) of components on a network is described. The system includes one or more processes that initiate and receive data streams directly or indirectly from components on the network or from other databases on the network. A dependency tree is created for each component relating each component to other components and to information characterizing the component. A portal is provided to export data feeds to other systems on the network and to generate reports and display usage information on each component on the network. Usage information may be grouped or summarized according to business function or by top level manager.

11 Claims, 17 Drawing Sheets

U.S. PATENT DOCUMENTS

| | | | | |
|---|---|---|---|---|
| 2002/0078231 | A1* | 6/2002 | Chang et al. | 709/238 |
| 2002/0158899 | A1* | 10/2002 | Raymond | 345/736 |
| 2003/0005041 | A1* | 1/2003 | Ullmann et al. | 709/203 |
| 2003/0130953 | A1* | 7/2003 | Narasimhan et al. | 705/59 |
| 2003/0172129 | A1 | 9/2003 | Moses et al. | |
| 2003/0200294 | A1 | 10/2003 | Thorpe et al. | 709/223 |
| 2003/0200304 | A1 | 10/2003 | Thorpe et al. | 717/113 |
| 2004/0059812 | A1 | 3/2004 | Assa | 709/224 |
| 2004/0093408 | A1* | 5/2004 | Hirani et al. | 709/224 |
| 2004/0183831 | A1* | 9/2004 | Ritchy et al. | 345/762 |
| 2004/0221038 | A1* | 11/2004 | Clarke et al. | 709/226 |
| 2006/0090007 | A1* | 4/2006 | Tonouchi | 709/245 |

OTHER PUBLICATIONS

JP1 Version 7i JP1/NETM/DM System Management 1 (for Windows®) Commentary/Operating Manual, Hitachi Ltd., Apr. 30, 2004, Second Edition, p. 143-150, 203-209, 247-254, 291-292, Citation 1 in JP 2007-550563, Notice of Reasons for Rejection, Feb. 8, 2010.

Whitman, Michael, Management of Information Security,—Complete IS Concepts and Strategies—, Thomson Learning, Dec. 10, 2004, First Edition, p. 341-355, Citation 2 in JP 2007-550563, Notice of Reasons for Rejection, Feb. 8, 2010.

JP 2007-550563, Decision of Rejection, Jul. 8, 2010.

JP 2007-550563, Notice of Reaons for Rejection, Feb. 8, 2010.

* cited by examiner

TECHNOLOGY ADMINISTRATIVE PORTAL

CROSS-REFERENCE TO RELATED APPLICATIONS

This application claims the benefit of prior filed U.S. provisional application No. 60/641,808 filed Jan. 5, 2005, which is incorporated herein by reference.

BACKGROUND OF THE INVENTION

1. Field of the Invention

The present invention relates to monitoring systems and methods for large networks. More specifically, the invention relates to methods and systems for monitoring a Return On Investment (ROI) of assets in a large network.

2. Description of the Related Art

Network administrators need to know the overall health of their networks in order to ensure continued operation of their networks without bottlenecks caused by network components operating at or near capacity. There are numerous examples of systems and methods that address this problem.

For example, U.S. Pat. No. 5,410,598 issued Apr. 25, 1995 to Shear describes a database usage metering system that measures and controls the usage of a static database. Shear, however, can not be used for dynamic databases found in many networks.

U.S. Pat. No. 6,810,361 issued Oct. 26, 2004 to Anderson describes a system to estimate the utilization of a network system component. U.S. Pat. No. 6,795,941 issued Sep. 21, 2004 to Nickels describes a method for diagnosing a network and U.S. Pat. No. 6,804,701 issued Oct. 12, 2004 to Muret et al. describes a system and method for analyzing network traffic.

U.S. Patent Application Publication 2003/0200294 and 2003/0200304, filed on Apr. 18, 2002 describes methods for automatically discovering devices connected to a network. The applications, however, do not teach or suggest methods to distill the collected raw data into information relevant to the IT or business manager.

Network administrators may find some or all of the mentioned examples useful in keeping their networks operating efficiently but they are less useful to the managers of the business areas the network supports. Business area managers may be responsible for a portion of the resources connected to the network and must justify their budgets for additional resources based on current utilization information. Therefore, there remains a need for systems and methods that can provide useful network utilization information to the top level business manager.

SUMMARY OF THE INVENTION

A system and method for determining and displaying return-on-investment (ROI) of components on a network is described. The system includes one or more processes that initiate and receive data streams directly or indirectly from components on the network or from other databases, or data sources, on the network. A dependency tree is created for each component relating each component to other components and to information characterizing that component. The dependency tree enables quick retrieval of all information relevant to a particular component and grouping of components according to business function or top level manager. A portal is provided to export data feeds to other systems on the network and to generate reports and display usage information on each component on the network. Usage information and ROI may be grouped or summarized according to business function or by top level manager.

One embodiment of the present invention is directed to a technology administrative portal (TAP) comprising: a loader configured to receive at least one data feed representing a network asset and configured to build a dependency tree linking the network asset to a top-level manager, the network asset and dependency tree stored in a TAP database; a data export module configured to generate and transmit at least one data file representing the network asset; and an action & display module configured to retrieve an inventory of network assets related to the top-level manager via the dependency tree and display the retrieved inventory grouped by the top-level manager. The TAP of claim 1 wherein the action & display module further comprises a search engine configured to retrieve data from the TAP database. In a further aspect, the retrieved inventory is further grouped by an application executing on a host. In a further aspect, the loader is configured to receive a second data feed linking the top-level manager to a business function and the action & display module displays the retrieved inventory grouped by the business function. In a further aspect, a Return On Investment (ROI) value is calculated for one or more hosts grouped by the top-level manager and based on information in the TAP database. In a further aspect, the ROI is calculated as a weighted average of a host replacement cost weighted by a host utilization. In a further aspect, the host utilization is a CPU utilization. In a further aspect, the host utilization is a maximum of a CPU utilization and a memory utilization.

BRIEF DESCRIPTION OF THE DRAWINGS

The invention will be described by reference to the preferred and alternative embodiments thereof in conjunction with the drawings in which:

FIG. 10 is an illustration of a web page displaying a return on investment (ROI) report used in some embodiments of the present invention;

FIG. 13 is an illustration of a web page displaying a health check report in some embodiments of the present invention;

FIG. 14 is an illustration of a web page displaying a dataserver health check report in some embodiments of the present invention;

DETAILED DESCRIPTION

The description herein should be understood to describe only one preferred embodiment of the invention. Those skilled in the art will recognize, for example, that the described embodiment is just one simplified example of the novel system and method of collecting and presenting information on the company's network assets to support and justify business decisions. The simplified example is all that needs to be described in detail in order to enable the more general system and method that the invention comprises.

Figure 1:
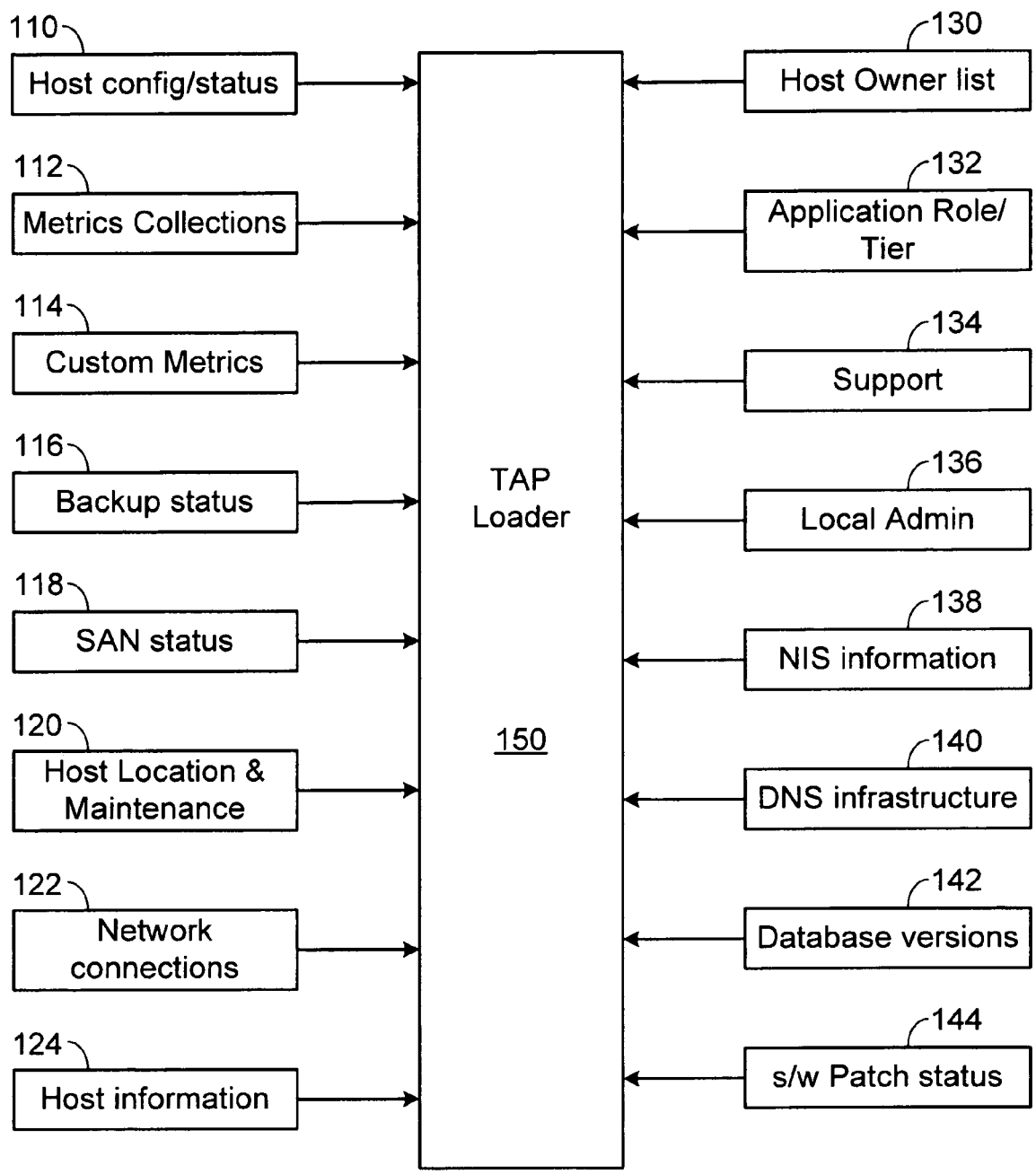
FIG. 1 is a diagram illustrating data flow collection in an embodiment of the present invention.

FIG. 1 is a diagram illustrating data flow collection in an embodiment of the present invention. In FIG. 1, a Technology Administrative Portal (TAP) loader 150 receives data feeds from one or more network processes containing information about the network. For example, a process collects configuration information and status 110 from each host, or server, on the network and passes the data to the TAP loader 150. The process to collect the configuration information and status 110 may be a simple script or program that logs onto each host and scans the host's hardware and software configuration and returns the configuration information and status 110 to the TAP loader 150. Hardware information may include a number of microprocessors in the host, microprocessor model, microprocessor speed, a size of random access memory, a size of hard disk memory in the host, a number, type, and ID of network interface cards in the host. Software information may include operating system and version and a list of applications and their version executing on the host. In other embodiments, the program or agent may reside on each host and return the information at a scheduled time or upon request from another agent executing on the TAP loader 150.

Metrics collections 112 may include CPU and memory utilization of each host on the network. The process to collect host metrics may be a script or program such as, for example, HP MeasureWare Server Agent available from the Hewlett-Packard Company of Palo Alto, Calif.

Custom metrics 114 may be collected from one or more hosts and presented to the TAP loader 150. Custom metrics 114 may include metrics not included in third-party software or may include metrics tailored to a specific server. Custom metrics 114 may be gathered by agent programs executing on the target host and transmitted to the TAP loader 150 in response to a request from the TAP loader or at predetermined time intervals.

Backup status information 116 may include backup status of each host, whether the backup was successful or terminated or put on hold. A process agent such as NetBackup™ available from Veritas Software Corporation of Mountain View, Calif. may be used to gather the backup status of each host on the network. A small interface agent may be used to couple the NetBackup API to the TAP loader 150.

Similarly, a process agent such as the CreekPath Suite available from CreekPath Systems, Inc. of Longmont, Colo. may be used to gather and report a Storage Area Network (SAN) status information to the TAP loader 150.

Host location and maintenance information 120 include the physical location of a host down to the rack position in a building. Maintenance information may include the serial number and model number of each host. The host location and maintenance information 120 may be maintained on a separate database management system such as, for example, Aperture VISTA™ available from Aperture Technologies, Inc. of Stamford, Conn. Host location and maintenance information 120 may be acquired by the TAP loader 150 by a query of the Aperture database.

Network connection information 122 describe the physical connections between hosts, routers, and switches. Network connection information 122 may be maintained by a separate application such as, for example, the CiscoWorks LAN Management Solution available from Cisco Systems, Inc. of San Jose, Calif. Network connection information 122 may be exported as a data file by the separate application or may be obtained through the application's API by the TAP loader 150.

Host information 124 identify the database or database server executing on each host on the network. Host owner list 130 identifies the top level manager and business function that owns each host. The information may be manually entered via a web page where an administrator of a new host machine enters the information when a new host is attached to the network. The information may be retrieved by the TAP loader 150 via a query to the host information database or via an exported data file from the host information database.

Application role and tier information 132 may be provided to the TAP loader 150 via a query or data feed from a database that contains the role and tier information for each application. In a preferred embodiment, the database may be an ADb as described in co-pending applications filed Dec. 29, 2004 and entitled, "System and Method for Corporate-Wide Policy Management" and "System and Method for Dynamic Business Continuity Planning," which are both incorporated herein by reference in its entirety. Each application may be assigned at least one role that connects the application to an owner or a P&L Group. In a preferred embodiment, each P&L Group reflects the management structure of the organization or corporation that owns the network. Using the host information 124 that associates each application with a specific host, each host may be associated with a P&L Group or a business area as defined by the organization's structure. Each application may also be assigned a tier to prioritize the application during a disaster recovery. The application's tier may be used to identify mission critical applications that the organization must recover before recovering less critical applications.

Support 134 provides information identifying the people and groups responsible for maintaining the operation of each host. Support information 134 may be maintained by a separate database application that may be queried by the TAP loader 150 to provide a current list of support personnel. In a preferred embodiment, a notification engine that automatically notifies the appropriate individuals when operation of a host computer is interrupted may be used to deliver support information 134 to the TAP loader 150 at scheduled intervals. Local administration information 136 may be a list of people authorized to administer each host. In a preferred embodiment, the support information 134 is supported and maintained by a directory services application such as, for example, Active Directory available from Microsoft Corporation of Redmond, Wash.

NIS information 138 identifies the servers that hosts the network information services that provide name and authentication resolution for other servers on the network. DNS infrastructure information 140 includes information about the IP services available to the network such as, for example, the IP to host match. The IP services may be administered by a DNS/DHCP IP management software such as, for example, VitalQIP® available from Lucent Technologies of Murray Hill, N.J.

Database versions information 142 provides the version of each application on the network. The software patch status information 144 provides reminders to each host administrator whenever a software patch for that type of host is released. The host administrator is responsible for applying the patch according to the operational constraints of the host machine.

Figure 2:
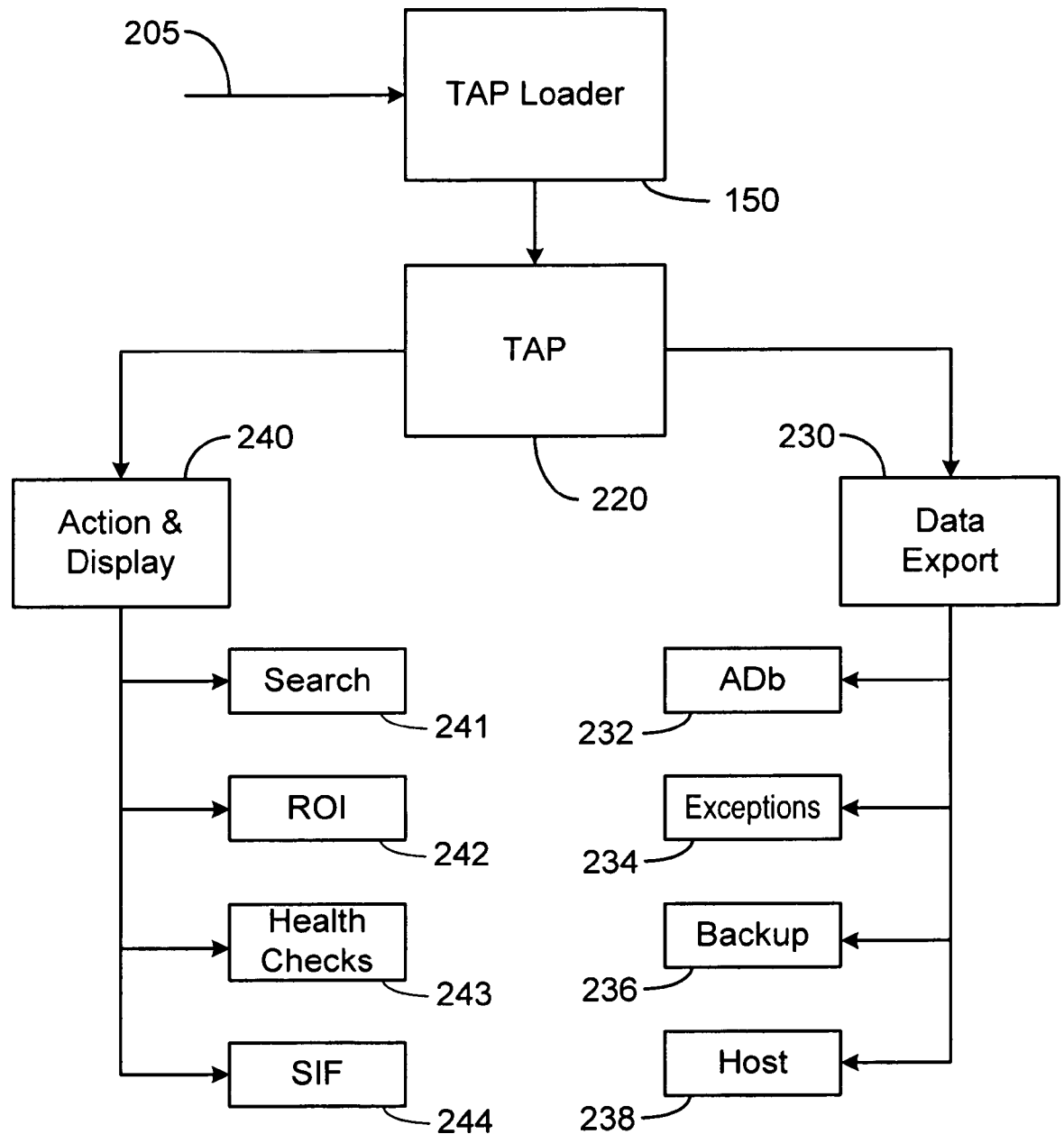
FIG. 2 is a diagram illustrating data flow in an embodiment of the present invention.

FIG. 2 is a diagram illustrating data flow from the TAP loader 150 in the embodiment shown in FIG. 1. After the TAP loader 150 receives the data feeds shown in FIG. 1, the loader builds a dependency tree for each application component. For example, an application component executing on a host creates a link between the component and the host. Similarly, if the host is connected to a switch, a dependency link is created between the host and switch. The dependency tree therefore relates each application component to the hardware infrastructure of the network. In a preferred embodiment, an application characteristic may be propagated to the application's dependent hardware. In an illustrative example, an application may be assigned a tier rating that reflects the criticality of the application to organization's operation. A tier rating of 1, for example, may indicate that the application is critical to the organization's operation and must be recovered before less critical applications after an incident. The tier rating of the application is propagated, or assigned, to network hardware and software in the application's dependency tree.

Each application is associated with a P&L group that becomes associated with the dependant hardware of the network. In a preferred embodiment, the software to P&L group association may be derived from an ADb that also maps each P&L group onto the hierarchal organization structure of the corporation.

The dependency trees enable the TAP loader 150 to group the network assets, or inventory, according to business function, which enables top level managers to roll up individual host utilization information according to business group transparently.

The dependency trees and inventory of assets are stored in a TAP database 220. The TAP database 220 provides a repository of network assets for the display 240 and export 230 of the network infrastructure information.

Data export 230 may be provided to other groups within the organization. Each data export, or report, may be filtered and formatted to include information specifically requested by other groups. For example, TAP may provide one or more data exports 232 to ADb and act as an authoritative data source for the information contained in the ADb data export 232. The information provided in the ADb data export may include host alias names, host physical location, applications running on each host, host DNS, host configuration, host file system, server backup, network changes, and host NIC card configurations. In a preferred embodiment, each data export may be a comma separated variable (CSV) data file. Data exports may be scheduled at periodic intervals or in response to requests from other applications.

Exception reports 234 may be generated and provided by TAP and include mismatches or inconsistencies between the data feeds 205 received by the TAP loader 150. For example, exception report 234 may include mismatches between TAP and an Aperture VISTA database. Such a mismatch may occur, for example, when a host is reconfigured or renamed and the change is not recorded in both databases.

Backup report 236 may be generated and provided by TAP and include server backup status at a job level detail. A separate report may be provided listing only the failed backup jobs. Host report 238 may be generated and provided by TAP and include host replacement cost, host tier information, and top level manager for each host. Other reports may also be generated and distributed to other requesting groups. For example, a report listing license information for all instances of a specific application may be generated for compliance purposes.

An action & display module 240 searches, retrieves, formats and displays requested information to the user. In a preferred embodiment, information is displayed to the user via a web page on the user's browser. The action & display module 240 includes a search module 241 that allows a user to view information about a specific host or multiple hosts. A Return On Investment (ROI) module 242 may calculate the ROI of each host and generate a report containing the total ROI by business function, platform, and region. A Health Check module 243 generates one or more reports on infrastructure components and presents a cohesive view of the status of the selected components. A Storage Information Framework (SIF) module 244 provides both management and support/operations groups an overview of operational factors that may impact the organization as a whole.

Figure 3:
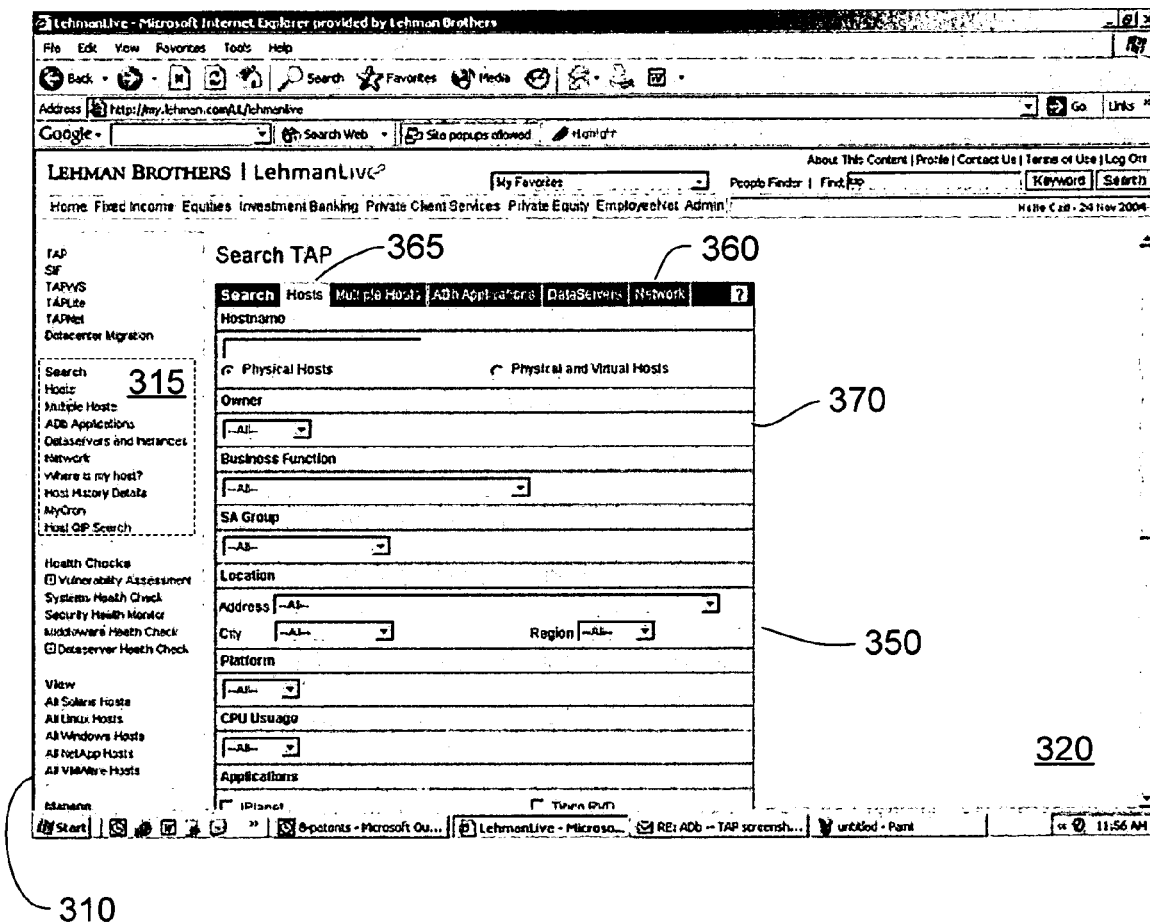
FIG. 3 is an illustration of a web page used in some embodiments of the present invention.

FIG. 3 is an illustration of a web page used in some embodiments of the present invention. In FIG. 3, a web page 300 includes a TAP navigation dashboard 310 and a display region 320 that displays information requested by the user. The TAP navigation dashboard 310 includes a search nugget 315 that allows the user to select a search method and a health check nugget that allows the user to select a specific health check report. A search nugget 350 is displayed in the display region 320 when a search is selected by the user. The search nugget 350 includes one or more tabs 360 that the user may select to choose a search method.

In FIG. 3, a host tab 365 is shown selected with the search nugget 350 displaying one or more search parameters 370 where the user may enter search information. Search parameters for a host search may include a host name, a business owner, a support group, a geographical location, a platform such as Solaris, Windows, or Linux, for example, a utilization, an application running on the host, an infrastructure component running on the host, an ADb application, and a backup state.

Other search methods may include a multiple host search, an ADb applications search, a dataserver search, and a network search. In the multiple host search, a user may enter multiple host and see a consolidated utilization of all the hosts entered by the user. In an ADb applications search, a user may view a list of all hosts that are modeled under an ADb application. Search parameters for an ADb application search may include an application name, a business function, a host name, a support group, a remedy group, and an owner. An ADb application is an application that is represented in ADb as an application asset type. A remedy group may be one or more individuals that are notified when an application or monitored system has a failed condition.

Figure 4:
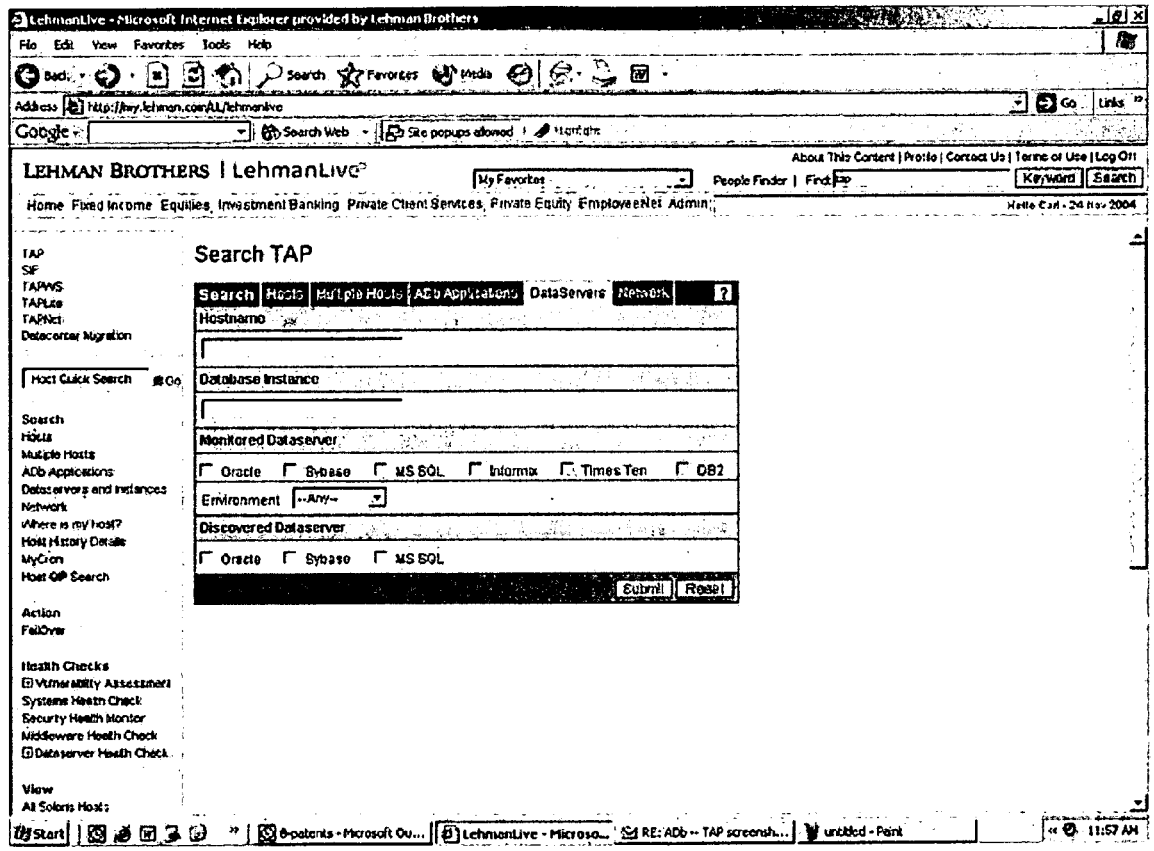
FIG. 4 is an illustration of web page displaying a dataserver search used in some embodiments of the present invention.

FIG. 4 is an illustration of web page displaying a dataserver search used in some embodiments of the present invention. In a dataserver search, a user may enter a dataserver or physical hardware and view information on the physical hardware hosting the dataservers. Search parameters for a dataserver search may include a host name, a dataserver instance or a name of a database, a monitored dataserver or a type of database or dataserver by vendor, a dataserver environment defined by a database administrator as primary, secondary, etc., and a discovered dataserver, which allows a user to search for database software discovered to be running on a physical host.

Figure 5:
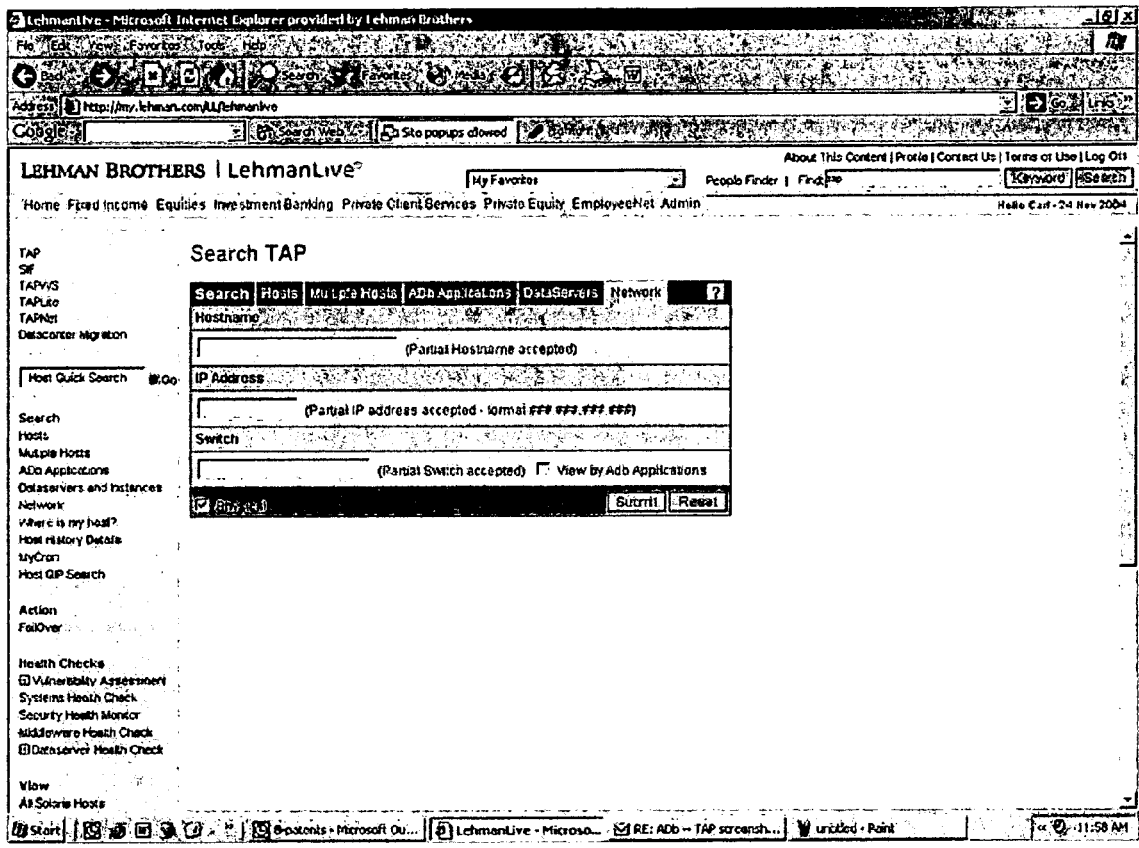
FIG. 5 is an illustration of web page displaying a network search used in some embodiments of the present invention.

FIG. 5 is an illustration of web page displaying a network search used in some embodiments of the present invention. In a network search, a user may view network related information for a search item. Search parameters for a network search may include a server, an IP address, and a network switch. The switch search may be filtered further to order results by ADb application thereby enabling the user to determine network concentration by criticality of applications and to determine a potential impact of an individual switch module or blade outage.

Figure 6:
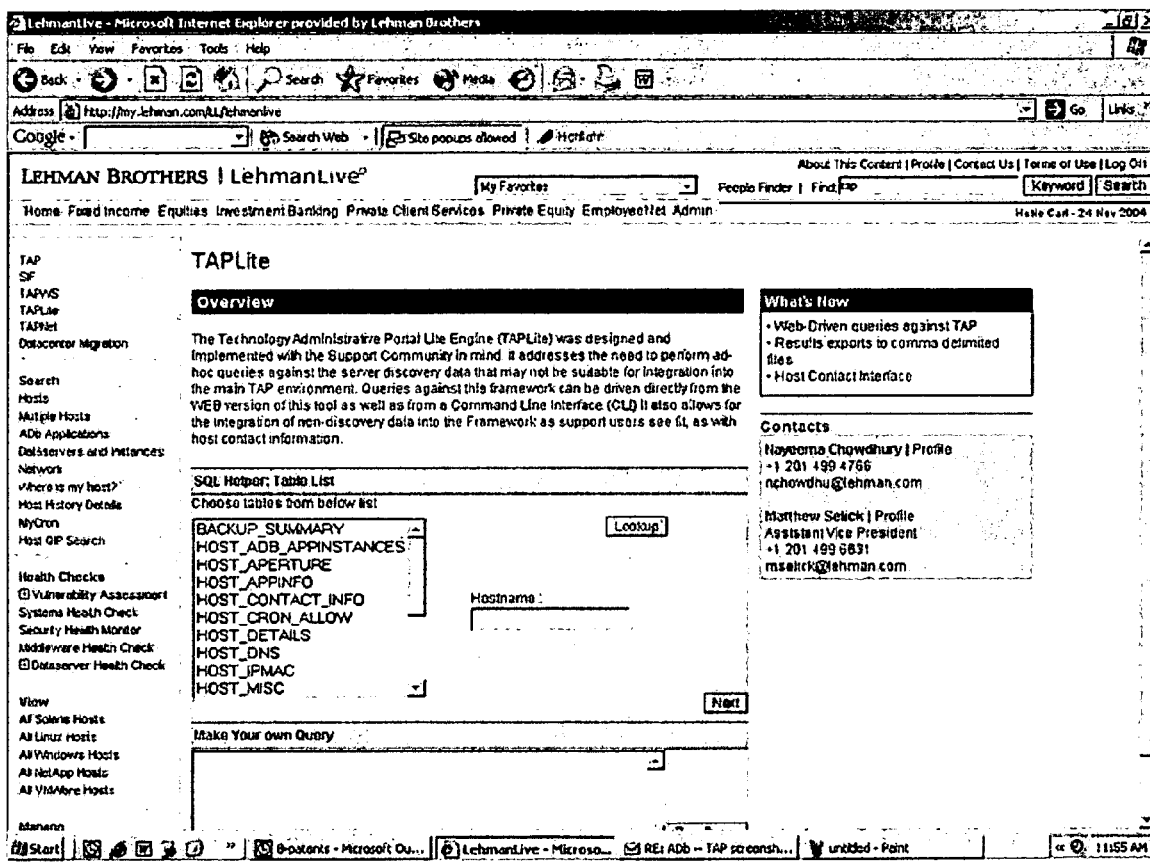
FIG. 6 is an illustration of web page displaying a TAP Lite search used in some embodiments of the present invention.

FIG. 6 is an illustration of web page displaying a TAP Lite search used in some embodiments of the present invention. The TAP Lite search may be useful for a support community and allows for entry of direct SQL queries into the TAP database through a TAP Lite web page 600 or via a command line interface.

The TAP navigation dashboard may also include simple but often used search methods. For example, engineering and support personnel frequently need to find the location of a specific host. The TAP navigation dashboard includes a "Where is my Host?" search where a user may enter the name of a physical host, a virtual host, or an alias and view the host's datacenter location, network location, and all aliases for that host. A host history details allows a user to enter a host name, host ID, or host serial number and view a listing of any identifiable features that may have changed throughout the host's life such as, for example, host name, host location, host status, and host owner. A MyCron search allows a user to enter a user ID, a host name, or an ADb application and view a list of chronological job engine (CRON) jobs running on the host without having to log in to an individual host and enter commands to return CRON information.

Figure 7:
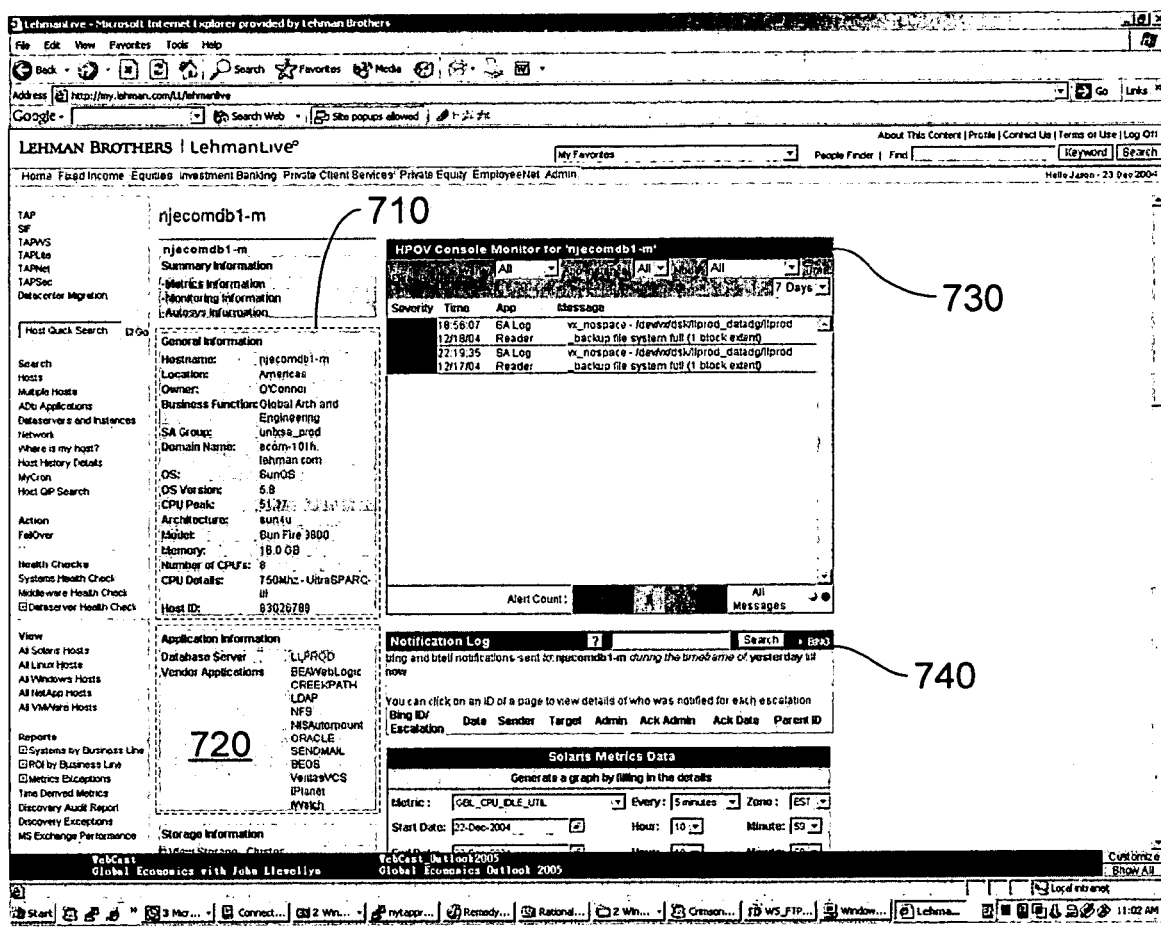
FIG. 7 is an illustration of a web page displaying a portion of a host details page (HDP) used in some embodiments of the present invention.
Figure 8:
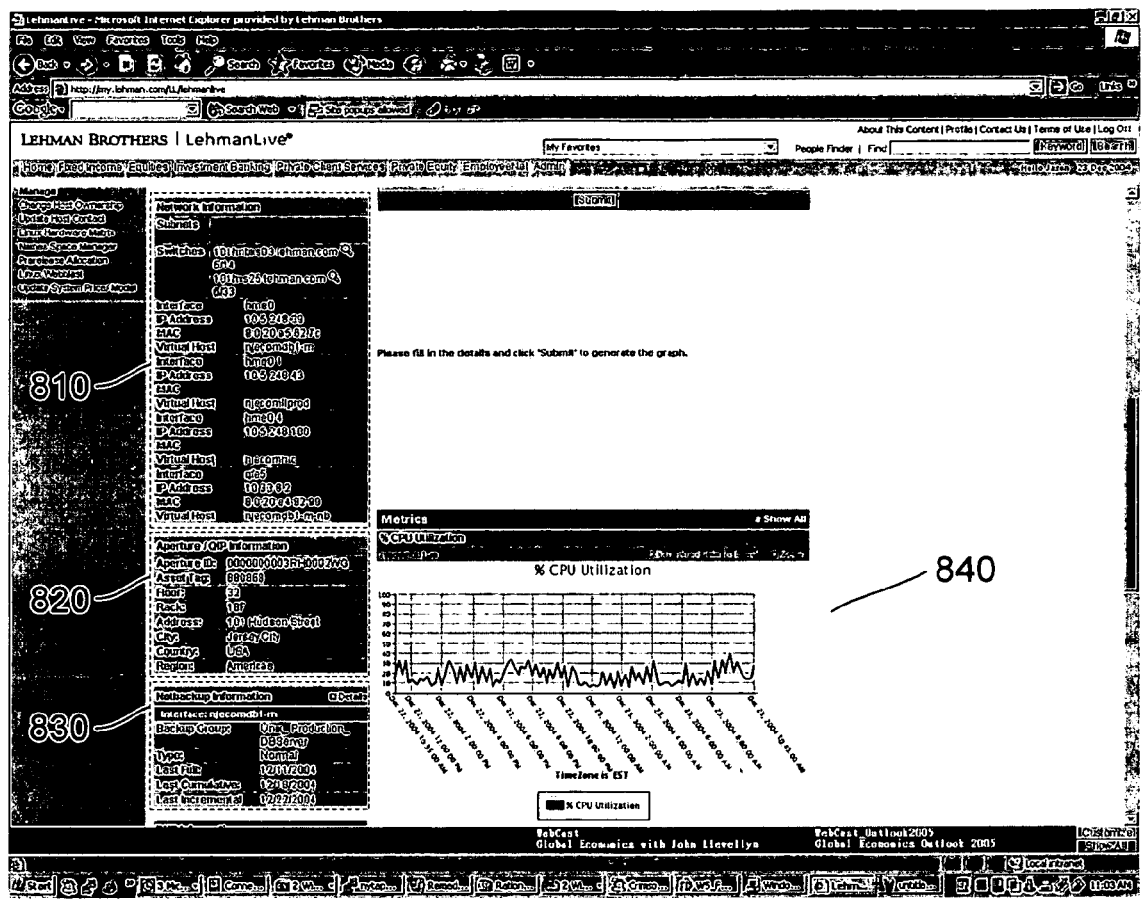
FIG. 8 is an illustration of a web page displaying another portion of the host details page (HDP) shown in FIG. 7.
Figure 9:
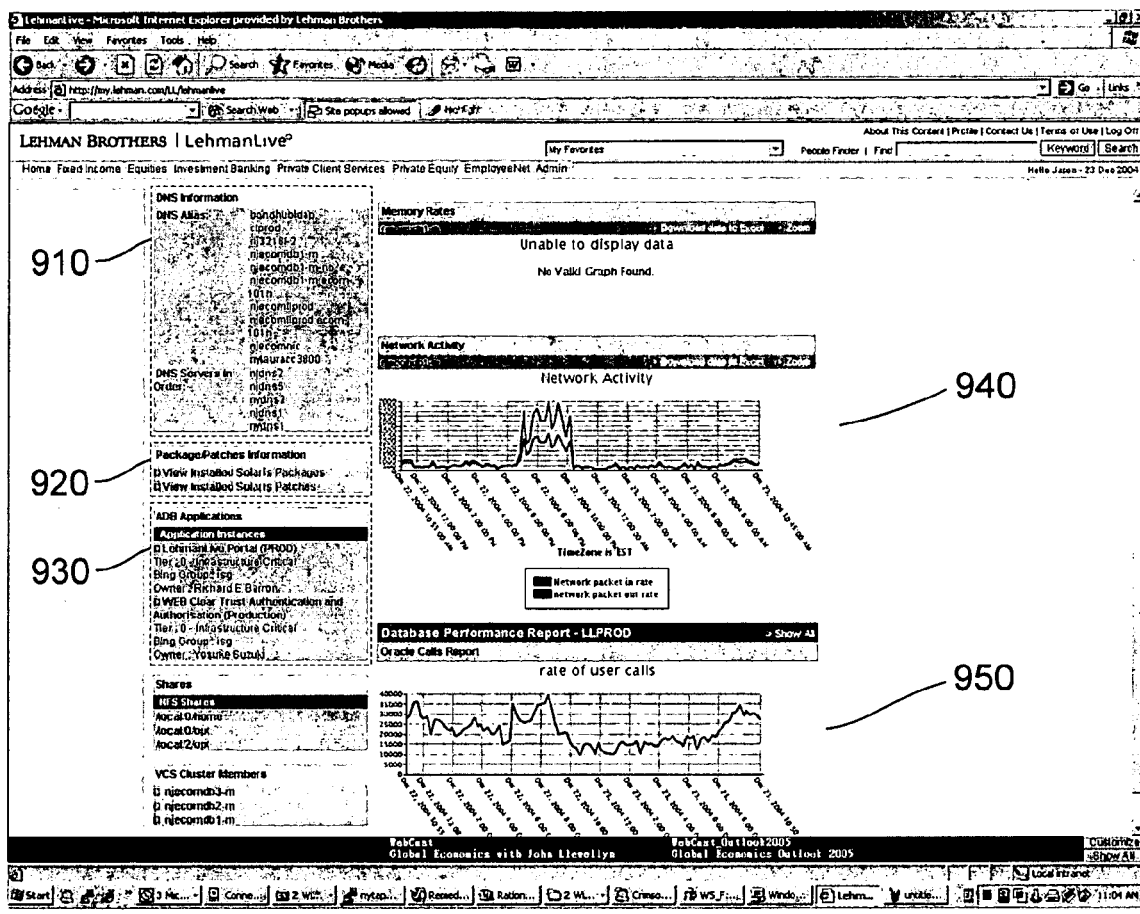
FIG. 9 is an illustration of a web page displaying another portion of the host details page (HDP) shown in FIG. 7.

FIGS. 7-9 are illustrations of a web page displaying portions of a host details page (HDP) used in some embodiments of the present invention. The HDP presents a representation of an individual host and provides details on the host obtained through the TAP loading process. The HDP may include one or more nuggets that display information about the host. A general information nugget 710 may include host name, geographical region, owner, business function, support group, domain name, operating system and version, architecture, model, memory, number of CPUs and details of each CPU, and host ID or serial number. An application information nugget 720 may include any database server or vendor application running on the host. A storage information nugget (not shown) may include an amount of Storage Area Network (SAN) storage, whitespace (available storage), and logical unit numbers associated with the host. A network information nugget 810 may include subnets, switches, and interfaces associated with the host, host IP address, MAC address, and host aliases or canonical names. An aperture nugget 820 may include information about the physical location of the host. A netbackup nugget 830 may include a backup status of the host. A DNS information nugget 910 may include DNS aliases and DNS servers on the host. A patches nugget 920 may display any patches or packages installed on the host or may include links to other web pages that contain detailed information about each patch or package installed on the host. An ADb applications nugget 930 may display instances of any ADb application associated with the host. Summary information may include metrics, monitoring information, notification log, CPU, memory, disk I/O, and network I/O utilization information. For example, a network activity chart 940 may be displayed showing the network activity of the host over the past 24 hours. A CPU utilization chart 840 may display CPU utilization over the past 24 hours. A database performance chart 950 may be displayed showing database activity on the host over the past 24 hours. A database performance chart 950 may be displayed showing database activity on the host over the past 24 hours. In another example, the HDP may include a notification log 740 that displays any notifications sent by the host over a predetermined time period. Other information may be added to the HDP through the addition of additional data feeds to the TAP loader. For example, the HDP may include the HPOV Console Monitor 730 obtained through a data feed from an Open View module executing on the host.

Figure 10:
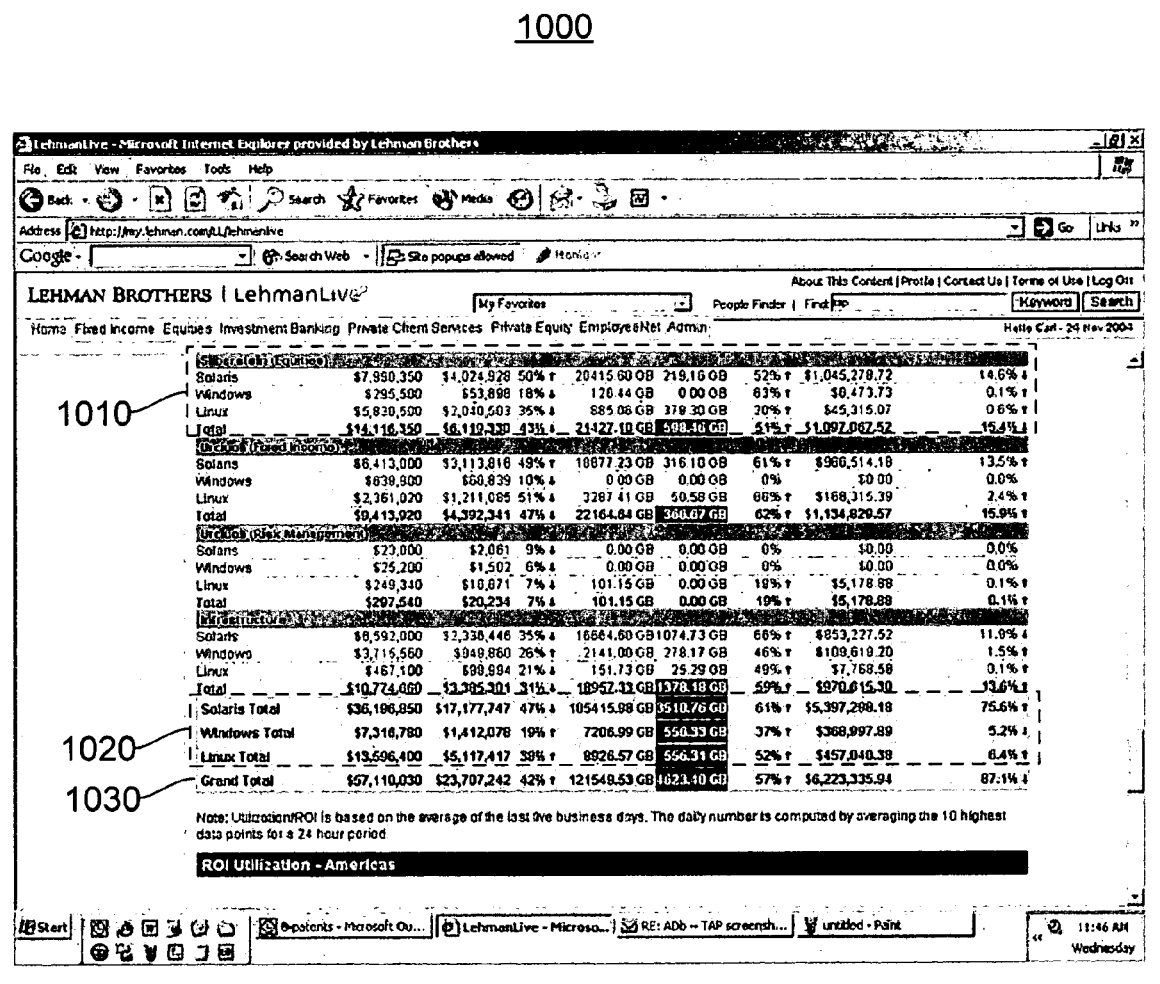

FIG. 10 is an illustration of a web page displaying a portion of a regional return on investment (ROI) report used in some embodiments of the present invention. The ROI report 1000 displays host ROI and storage utilization by top level manager or business function 1010 and by platform. Each entry includes a platform, a total replacement cost, an ROI value, a % ROI, an amount of mapped storage assigned to the business function, white space, storage utilization, storage value, and a percentage of regional storage. Summary rollups by platform 1020 and for the entire region 1030 may be displayed in the ROI report 1000.

The total replacement cost may be a sum by platform of the replacement cost of each host owned by the top-level manager. Each host is assigned a replacement cost that is the cost to replace the host's baseline performance specification. In a preferred embodiment, replacement costs are updated quarterly.

The ROI value may be determined as a weighted average of host replacement costs weighted by the host's CPU utilization. In some embodiments, the ROI value may be determined as a weighted average of host replacement costs weighted by the host's memory (RAM) utilization. Other methods for determining ROI may be used and selected depending on the specific platform. For example, ROI based on CPU utilization may be used for UNIX and Windows platforms. Linux platforms, in contrast, may select the greater of a CPU-based ROI and a memory-based ROI. The CPU utilization and memory utilization for each host may be obtained from one of the data feeds into the TAP loader. In a preferred embodiment, the CPU or memory utilization may be a five-day moving average of an average of the top 10 peak utilization values within a 24 hour period. Alternative methods of calculating a utilization value such as selecting a maximum value over a shorter interval, for example, may be used and should be understood to be within the scope of the present invention.

Mapped storage includes storage assigned to the business function by storage management. White space includes a difference between the mapped storage and a configured (useable) storage on the host. Storage utilization may be a percentage of configured storage utilized by the business function and storage value may be the value per Mb of assigned storage. Regional storage may be a percentage of storage assigned to the business function to the total regional storage.

Figure 11:
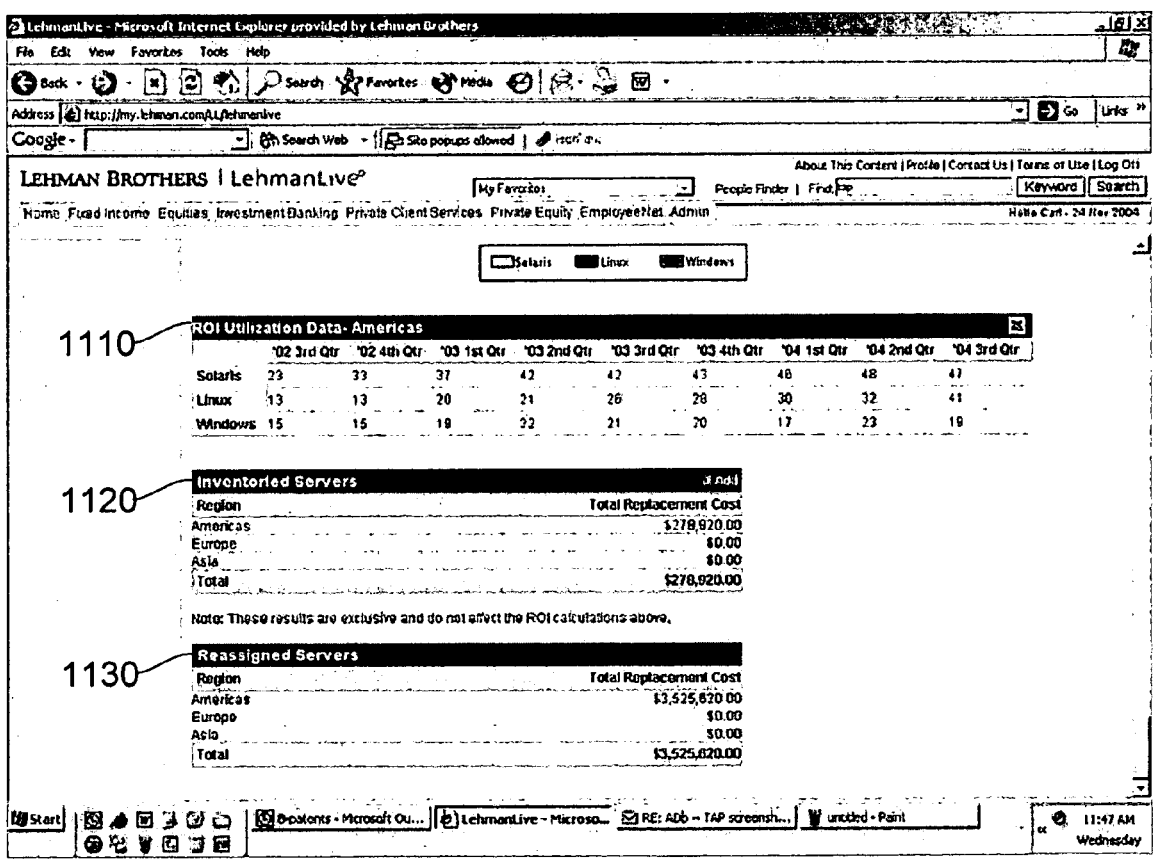
FIG. 11 is an illustration of a web page displaying another portion of the regional return on investment (ROI) report shown in FIG. 8.

FIG. 11 is an illustration of a web page displaying another portion of the regional return on investment (ROI) report shown in FIG. 10. In FIG. 11, ROI utilization by platform and by quarter 1110 may be presented in tabular form or as a graph or chart (not shown). An inventoried servers table 1120 may be presented that displays a total replacement cost by region for a business function. The total replacement cost shown in inventoried servers table 1120 represents the replacement costs of servers that are reclaimed or decommissioned from the business function. A reassigned servers table 1130 may be presented that displays a total replacement cost of servers that were reassigned to other functions after decommissioning and reclaiming.

Figure 12:
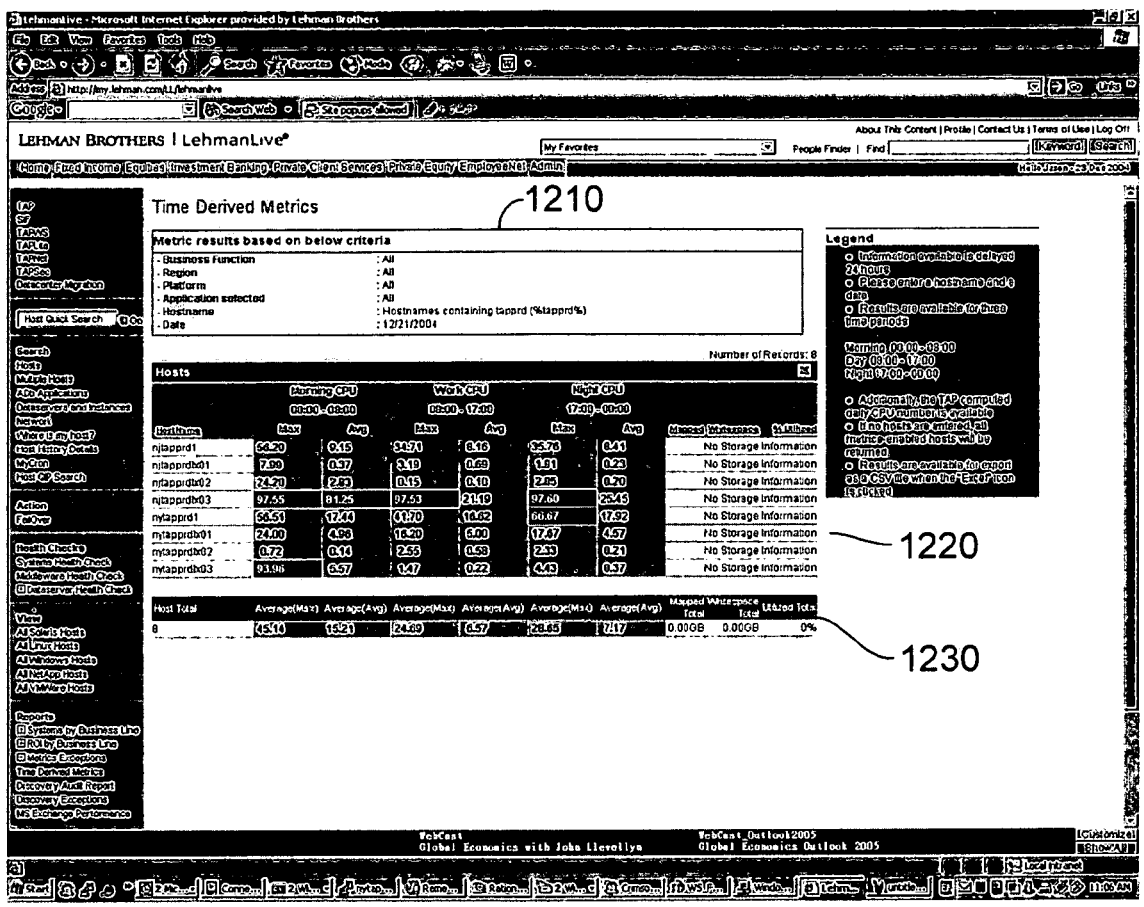
FIG. 12 is an illustration of a web page displaying time derived metrics for an individual host.

FIG. 12 is an illustration of a web page 1200 displaying time derived metrics for an individual host. A TAP report generator may retrieve and display utilization of a specific host, multiple hosts, or hosts belonging to an ADb application during one or more time periods throughout a day. The utilization information retrieved may be filtered by business function, region, platform, applications, time period, and host name. Displaying utilization throughout the day may assist a support group in deciding when maintenance should be performed or may identify candidates for grid computing tasks. In FIG. 12, a filter nugget 1210 displays a set of filter parameters used to retrieve the utilization data shown in a hosts nugget 1220. The hosts nugget 1220 displays an entry (row) for each host satisfying the filter parameters in the filter nugget 1210. Each entry displays a maximum CPU utilization and an average CPU utilization for each of three periods during a day. A summary nugget 1230 displays maximum and average CPU utilizations averaged over all the hosts shown in the hosts nugget 1220.

Figure 13:
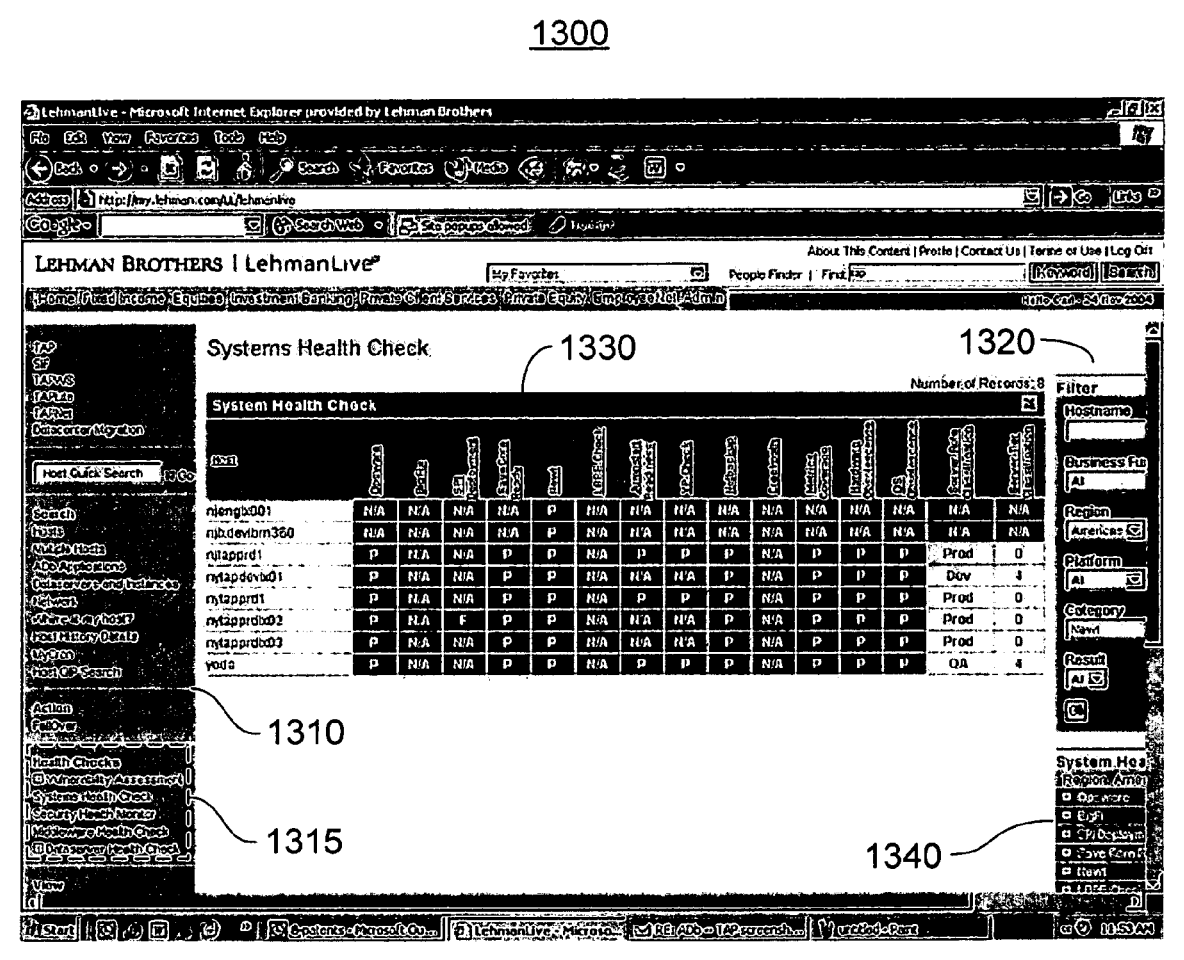

FIG. 13 is an illustration of a web page displaying a health check report in some embodiments of the present invention. In FIG. 13, a web page 1300 includes a navigation dashboard 1310 that allows a user to select a report for display. A health check nugget 1315 allows a user to quickly view a health check report by clicking on one of the health checks in the nugget 1315. A vulnerability assessment a comprehensive view of a security state of an organization's Windows environment. A list of Windows hosts that are non-compliant with issued patches, virus threats, or general security guidelines may be included in the vulnerability assessment. Each threat may be assigned a threat level by a security engineering group and indicated in the vulnerability assessment. The vulnerability assessment may be extended to cover Windows workstations in addition to Windows servers.

A systems health check may display information tailored to a support group and may report on infrastructure components relevant to the support group. Infrastructure components may include third party components such as HPOV SPI deployment, Creekpath coverage, and Netbackup Status, for example, and may include custom modules that monitor metrics coverage, disk utilization, jumpstart readiness, and save core status. A user may filter the reports by host name, business function, region, platform, category, and result (show all that pass, for example). In FIG. 13, a systems health check report 1330 is displayed listing hosts and a status of each component on the host. The list has been filtered according to one or more parameters selected in a filter nugget 1320. A links nugget 1340 provides links to an underlying report containing detailed information and status of one or more individual health checks.

A security health monitor may display information tailored to a security group and may report on security specific initiatives. Security initiatives may include eTrust coverage, Rhost compliance, local administrator accounts present, sendmail installations and active daemons, and sendmail versions and their patch level compliance. A user may filter the report by host name, business function, region, platform, and result. A middleware health monitor may display information on a state of the organization's middleware infrastructure. Middleware information may include middleware configuration, J2EE applications, JDBC configuration, WebApp configuration, and HP WebLogic SPI.

Figure 14:
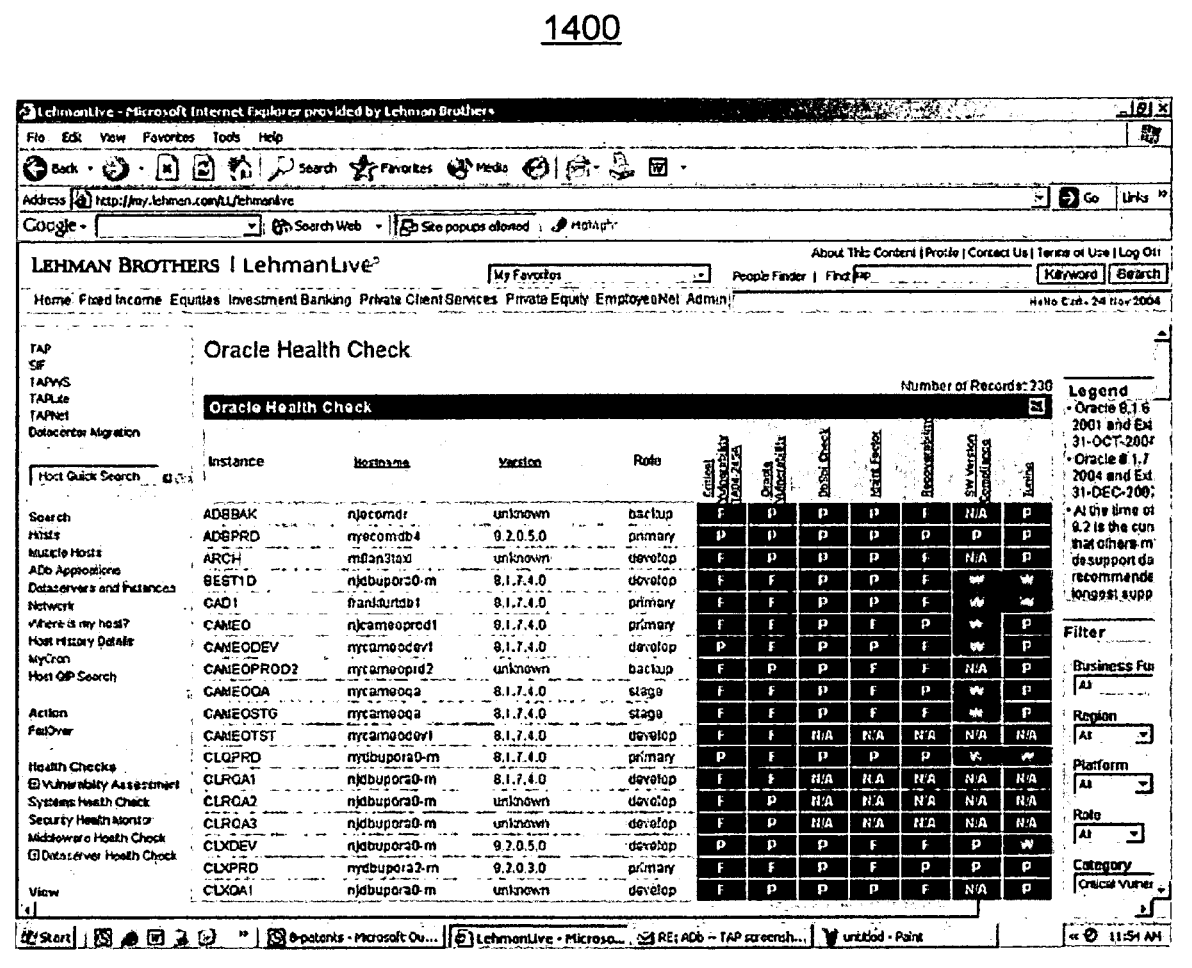

A dataserver health monitor may report and display a compliance state of each monitored dataserver at a physical host level or at an individual database instance. FIG. 14 is an illustration of a web page displaying an Oracle dataserver check report in some embodiments of the present invention.

Figure 15:
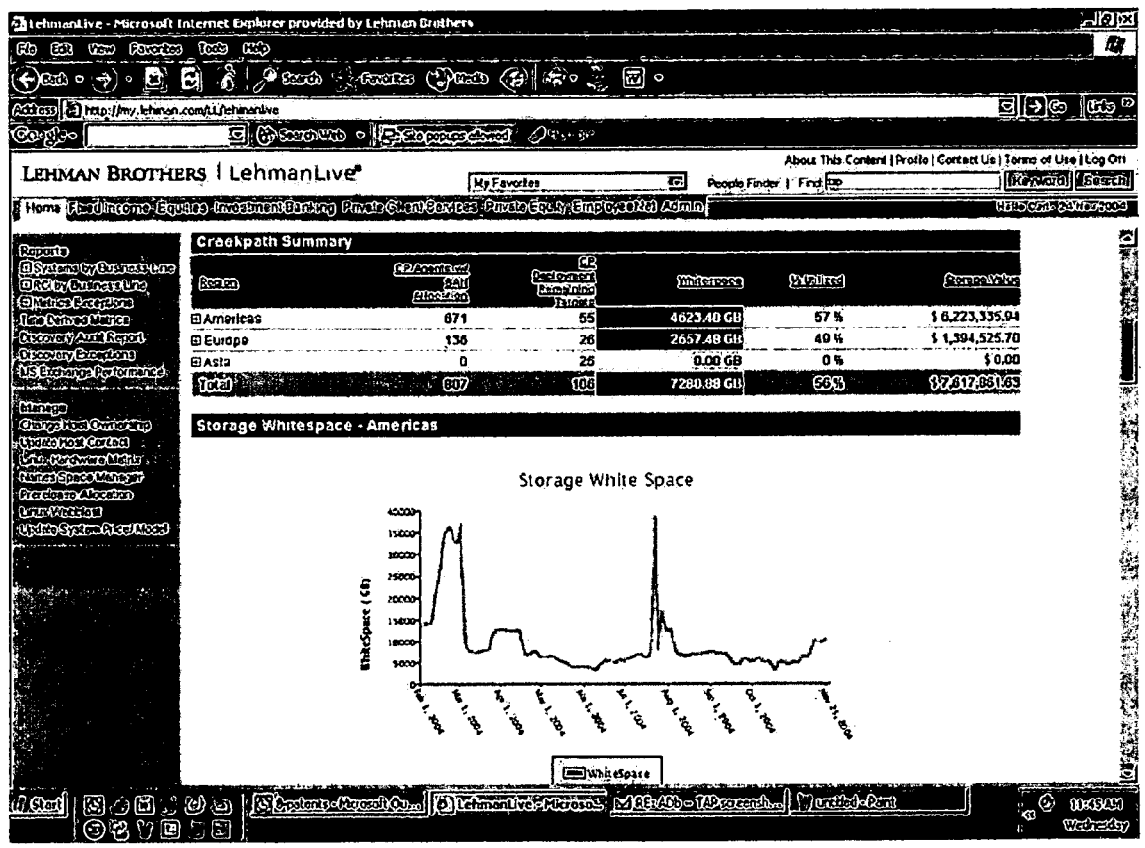
FIG. 15 is an illustration of a web page displaying a whitespace summary in some embodiments of the present invention.

FIG. 15 is an illustration of a web page displaying a whitespace summary as part of a SIF report generated by the SIF module. In some embodiments, whitespace information may be obtained through a third party module such as Creekpath and processed by the TAP loader and stored as part of a TAP database. In FIG. 15, the number of Storage Area Network (SAN) attached hosts with a working Creekpath agent, the number of hosts without a Creekpath agent, an amount of assigned or mapped storage, and an amount of misconfigured storage or white space are presented in a table by region. A chart, or graph, may be included in the web page 1500 that presents historical white space information for a selected region.

The SIF module may also generate and display a Netbackup summary providing an overview of the previous day backup state of all servers in the organization by region. The SIF module may also include a search engine that allows a user to retrieve reports on a state of a backup job on a specific host, retrieve tape utilization reports, and identify a tape ID for a specific host for a given date range.

Figure 16:
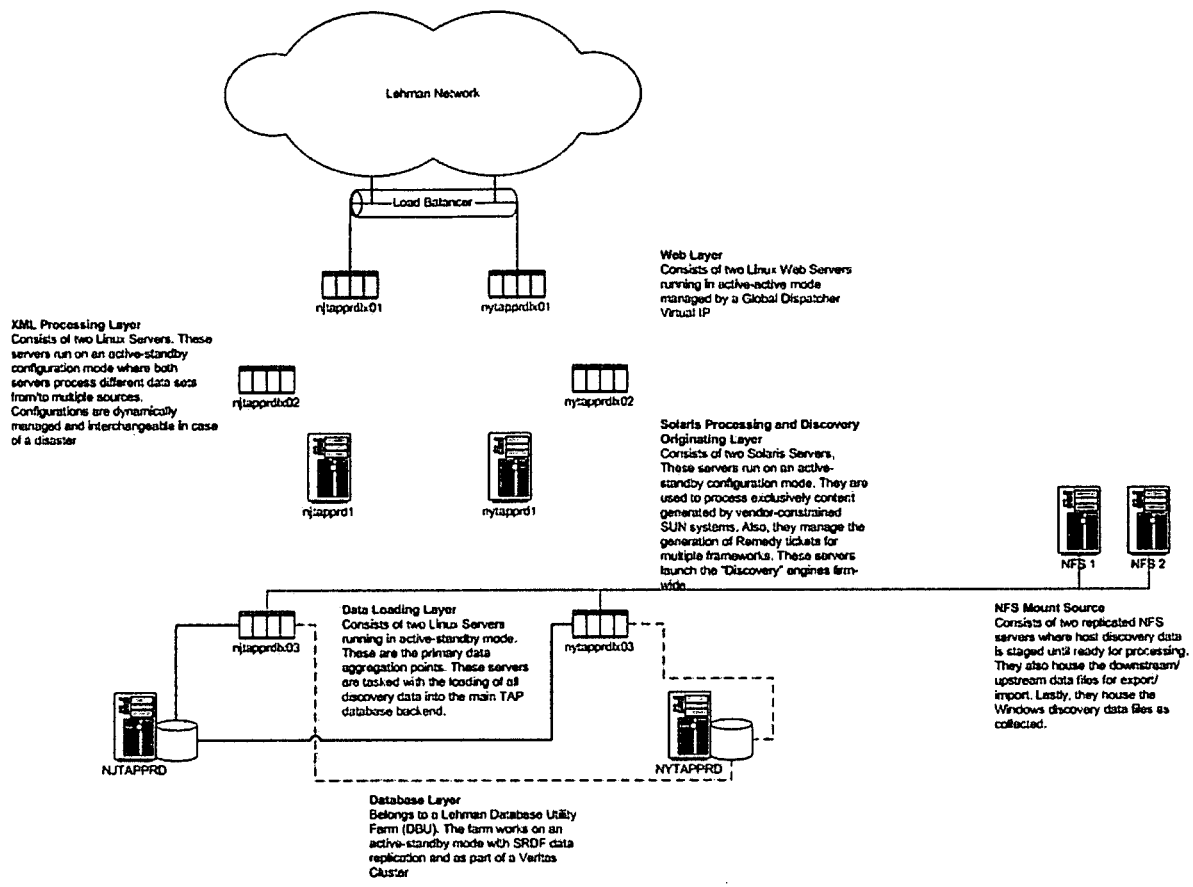
FIG. 16 is a diagram illustrating a physical architecture used in some embodiments of the present invention.
Figure 17:
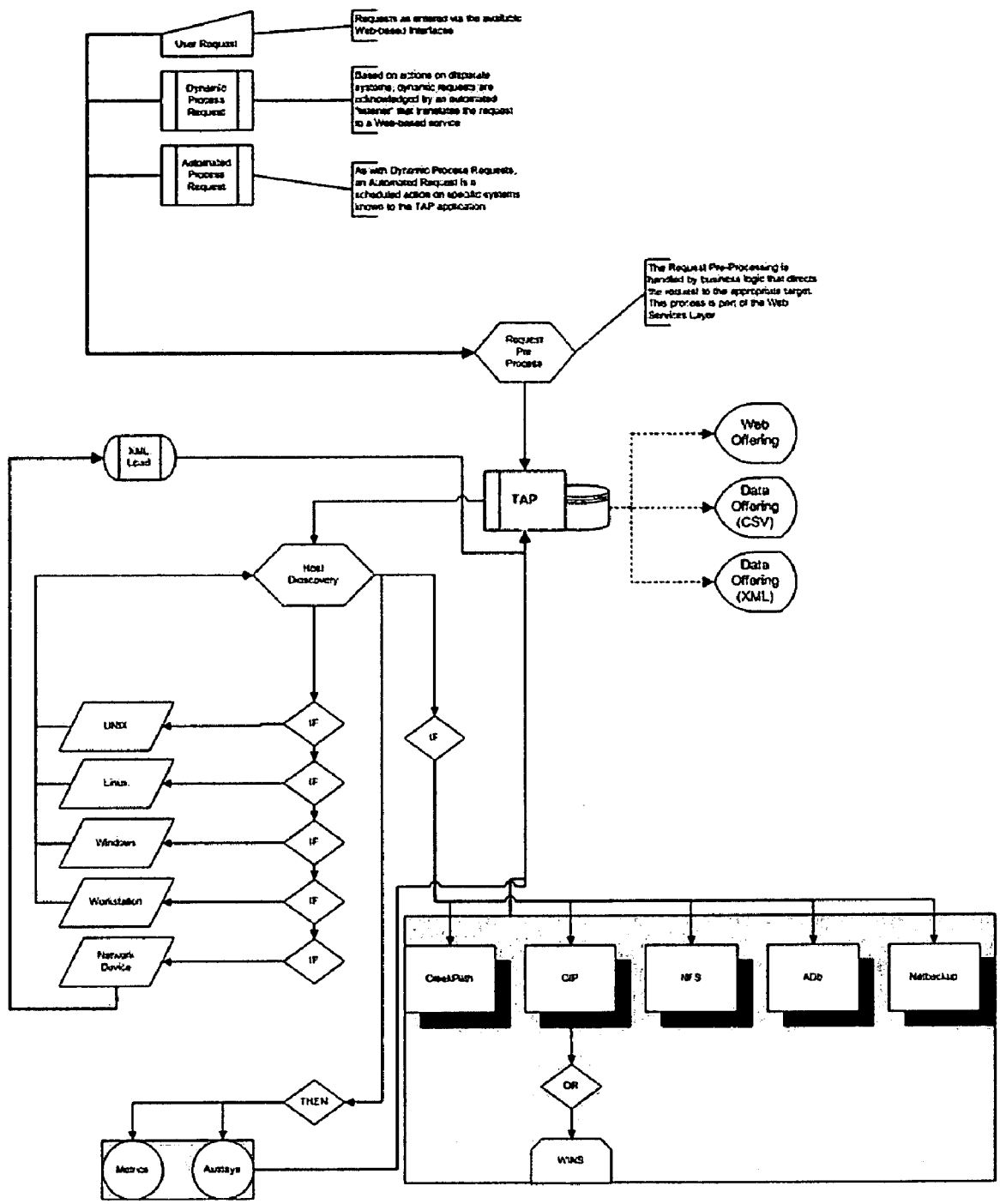
FIG. 17 is a diagram illustrating a logical architecture used in some embodiments of the present invention.

FIG. 16 is a diagram illustrating a physical architecture used in some embodiments of the present invention. FIG. 17 is a diagram illustrating a logical architecture used in some embodiments of the present invention.

The ability to calculate a ROI for each server or application allows managers to clearly ascertain costs associated with a function. For example, embodiments of the present invention can provide managers with costs associated with a company's network backup policy. Using such information, managers can adjust the backup policy to save only the information that is deemed worthy of historical record-keeping while disabling backup of servers that do not need to be backed-up regularly. Instead of an all-or-nothing backup policy, the company can contain backup costs by only backing up the data that needs to be backed up.

In addition to providing return on investment information on servers on the company's network, embodiments of the present invention may also cohesively map the state of a group of servers or business applications and provide such information not only to first level support responders but also to senior company managers in a form that is useful to the viewer.

Embodiments of the present invention comprise computer components and computer-implemented steps that will be apparent to those skilled in the art. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:

1. A technology administrative portal (TAP) comprising:
a loader that receives at least one data feed representing a network asset and builds a dependency tree linking the network asset to data regarding a top-level manager, said data regarding the top-level manager comprising an identity of a person, wherein the network asset and the dependency tree are stored in a TAP database;

a data export module that generates and transmits at least one data file representing the network asset; and an action and display module that retrieves an inventory of one or more network assets and displays the retrieved inventory grouped by the top-level manager, wherein a Return On Investment (ROI) value is calculated for one or more network assets grouped by the top-level manager based on information in the TAP database; and wherein the loader further receives a second data feed linking the data regarding the top-level manager to data regarding a business function.

2. The TAP of claim 1 wherein the action and display module comprises a search engine that retrieves data from the TAP database.

3. The TAP of claim 1 wherein the retrieved inventory is further grouped by an application executing on a server.

4. The TAP of claim 1 wherein the action and display module further displays the retrieved inventory grouped by the business function.

5. The TAP of claim 1 wherein the ROI value is calculated as an average of a server replacement cost weighted by a server utilization.

6. The TAP of claim 5 wherein the server utilization is a CPU utilization.

7. The TAP of claim 5 wherein the server utilization is a maximum of a CPU utilization and a memory utilization.

8. A computer-implemented method comprising:
collecting at least one data feed representing a network asset;
linking the network asset to data regarding a top-level manager, said data regarding said top-level manager comprising data regarding an identity of a person;
storing the data feed representing the network asset and the link to the data regarding the top-level manager in a database;
calculating a Return on Investment (ROI) value for one or more network assets grouped by the top-level manager based on information in the database;
displaying the ROI value for the top-level manager; and
collecting at least a second data feed linking the data regarding the top-level manager to data regarding a business function.

9. The computer-implemented method of claim 8 wherein calculating the ROI value comprises averaging a server replacement cost weighted by a server utilization.

10. The computer-implemented method of claim 8 further comprising retrieving an inventory of one or more network assets from the database and displaying the retrieved inventory grouped by the business function.

11. The computer-implemented method of claim 8 further comprising retrieving an inventory of one or more network assets from the database and displaying the retrieved inventory grouped by an application executing on a server.

* * * * *